United States Patent [19]

Cote et al.

[11] Patent Number: 5,501,443
[45] Date of Patent: Mar. 26, 1996

[54] DEVICE FOR THE RELEASE OF FOLDED PRODUCTS

[75] Inventors: Kevin L. Cote, Durham, N.H.; Richard D. Curley, Haverhill, Mass.

[73] Assignee: Heidelberger Druckemaschinen AG, Heidelberg, Germany

[21] Appl. No.: 349,110

[22] Filed: Dec. 2, 1994

[51] Int. Cl.$^6$ ............................ B65G 37/00; B65G 47/10
[52] U.S. Cl. ........................ 270/058; 198/370.03; 271/204
[58] Field of Search .................... 271/204, 205, 271/206, 277; 198/370.03, 370.04, 370.05; 270/54, 55, 57, 58

[56] References Cited

U.S. PATENT DOCUMENTS

| | | | |
|---|---|---|---|
| 2,344,596 | 3/1944 | Carmina | 198/370.04 X |
| 3,610,579 | 10/1971 | Jiruse | 271/206 |
| 4,678,174 | 7/1987 | Reist . | |
| 4,767,112 | 8/1988 | Köbler . | |
| 4,775,136 | 10/1988 | Petersen . | |
| 4,828,242 | 5/1989 | Köbler et al. . | |
| 4,905,986 | 3/1990 | Muller | 271/277 |
| 5,168,977 | 12/1992 | van Essen et al. | 198/370.05 X |
| 5,244,078 | 9/1993 | Silva et al. | 198/803.7 X |
| 5,311,976 | 5/1994 | Backman | 198/370.05 X |

*Primary Examiner*—John E. Ryznic
*Attorney, Agent, or Firm*—Kenyon & Kenyon

[57] ABSTRACT

A device for the release of folded products transported by a rotating endless conveyor is provided. The conveyor transports identical product holders past a release module. The release module comprises rotating members, such as the links of a chain, on which swivelable blocks are mounted. As the identical product holders are transported beneath the release module, each product holder is associated with a swivelable block. Selectively actuable ramps in the release module, when actuated, cause swivelable blocks which have a tab corresponding to the actuated ramp to swivel. The swiveling of a block causes the product holder associated with it to release its product.

17 Claims, 3 Drawing Sheets

| RELEASE MODE | RAMP ACTIVATED | BLOCKS ACTIVATED |
|---|---|---|
| DROP A (EVERY EVEN) | RAMP 15 | BLOCKS 22 AND 24 |
| DROP B (EVERY ODD) | RAMP 17 | BLOCKS 21 AND 23 |
| DROP C (EVERY THIRD) | RAMP 16 | BLOCKS 21 AND 24 |
| DROP ALL | RAMP 15 AND 17 | BLOCKS 21, 22, 23, 24 |

Fig. 3

DEVICE FOR THE RELEASE OF FOLDED PRODUCTS

FIELD OF THE INVENTION

The present invention relates to a device for the release of folded products on a conveying device.

BACKGROUND OF THE INVENTION

U.S. Pat. No. 4,767,112 discloses a device for receiving and further conveying folded products. Arms which respectively have a gripper are attached to a transport chain. These arms are made to change their movement from a linear to an arcuate motion at a folded-product transfer station, whereby a decrease in speed is effected. After the take-over of the folded products by the grippers of the arms which are controlled by a stationary cam, the link elements of the transport chain enter between two guide rails. At the first guide rail a further cam is arranged through which each gripper of each arm is made to open itself when situated above a folded-product transfer station. However, delivery of folded products to different delivery stations is not possible.

U.S. Pat. No. 4,775,136 discloses a product folding and transporting system whereby the products can be inserted into individual compartments of the transport system. Above the product transport system there is provided a rotating chain, the outwardly extending tabs of which cause the uniform opening of individual compartments of the transport system. Into these compartments opened in this manner products are inserted, with their initially incomplete folding spine being completed just before entering a respective compartment. For this purpose rotating spreading elements are arranged around the rotating chain.

U.S. Pat. No. 4,828,242 shows another transport system for folded products. A plurality of interconnected segments moved in sequence on a guide rail are conveyed further in that lower tabs engage with the individual segment edges. As the tabs on the rotating chains,are equally spaced from one another, the spacing of the products conveyed is maintained accordingly. By means of an endless gear belt rotating below the a guide rail, whereon the segments are movably arranged, the spacing between the individual segments on the guide rail can also be maintained uniformly.

U.S. Pat. No. 4,678,174 discloses a device for receiving and further conveying folded products. By means of this device the open ends of the products can remain open during conveyance in hanging position, or the products can be conveyed changing from an open to a closed condition. There is no mention made of a differentiated deposit of the folded products at different delivery locations.

There is a need for folded products, which have been processed in a folding apparatus and are transported out of it, to be directed to different delivery locations. For example, depending on the printed image produced by the form cylinder of the printing units of the preceding rotary press and depending on the folding mode, each second or third product of the product stream may be identical. As such, the need arises to collect the products identical to one another on one location, where further processing—for example adding inserts to these identical products—can take place.

SUMMARY OF THE INVENTION

In accordance with an embodiment of the present invention, a device for the release of folded products on a conveyer includes a conveyor which transports identical product holders and a release module including rotating members to which swivelable blocks are connected. Tabs are provided in various positions on the swivelable blocks. The blocks may be divided into various block types, each block type having a different tab arrangement. The release module further includes ramps which can be selectively moved between an actuated position and a deactuated position. The ramps are arranged relative to the swivelable blocks such that, when actuated, each ramp acts on the tabs of one or more selected block types, thereby releasing the corresponding product holders traveling beneath the selected blocks.

The present invention thereby eliminates the use of high speed cams to actuate the individual product holders, thereby reducing manufacturing costs. The present invention operates as follows. A conveyor carrying identical product holders passes by the release module. The release module has swivelable blocks mounted on rotatable members, such as a chain. As the product holders pass the release module, one block is associated with each of the identical product holders. The release module has a plurality of selectively actuable ramps, and the blocks have one or more tabs corresponding to one or more of the ramps. When a block with a tab that corresponds to an actuated ramp passes by that ramp, the block swivels, which causes the product holder associated with that block to release. Those blocks with tabs that do not correspond to any actuated ramp do not swivel, and their associated product holders do not release. As a result, every second or every third product holder, for example, will release its product as it passes by the release module. In this way, products carried by identical product holders may be separated from the product stream according to delivery or deposit requirements.

In accordance with another embodiment of the present invention, the length of the selectively actuable ramps may be varied in order to control the amount of time during which the product holders are held open, i.e., the shorter the actuable ramp, the shorter the amount of time that the product holders will be held open. Moreover, in addition to arranging the actuable ramps next to one another, the actuable ramps can also be arranged one behind the other.

Moreover, the selectively actuable ramps may be actuated by units supplied with a pressure medium, through electromagnetic actuation, by an electric motor, or with lever bars.

In accordance with a further embodiment of the present invention, the blocks are mounted on the rotating members by swivel axes with set-back elements, so that the blocks will not swivel due to their own weight. As a result, the only time a particular block will swivel is when it passes beneath an actuated ramp which corresponds to one of the tabs on that particular block.

The swivelable blocks may be divided into several block types, each block type having a different arrangement of tabs. For example, a first block type could have center tabs and first outer tabs, a second block type could have only second outer tabs, a third block type could have only first outer tabs, while a fourth block type could have center tabs and second outer tabs.

Continuing the example, the actuation of a selectively actuable ramp, corresponding to the second outer tab, would cause blocks of the second and fourth block types to rotate. The actuation of a second selectively actuable ramp, corresponding to the first outer tab, would cause blocks of the first and the third block types to rotate. The actuation of a third selectively actuable ramp, corresponding to the center tab, would cause blocks of the first and the fourth block types to rotate.

By actuating one or more of the ramps, it is thereby possible to cause different combinations of product holders to release as they pass beneath the release module. It is possible, for example, to open every second or every third product holder which passes the release module. It is also possible to actuate certain pluralities of ramps such that every product holder passing the release module releases, thereby allowing continuous delivery to one individual station to take place.

BRIEF DESCRIPTION OF THE DRAWINGS

FIG. 3 is a table which illustrates the operation of the release modules as a function of the selectively operable ramps of FIGS. 1 and 2.

DETAILED DESCRIPTION OF THE INVENTION

Figure 1:
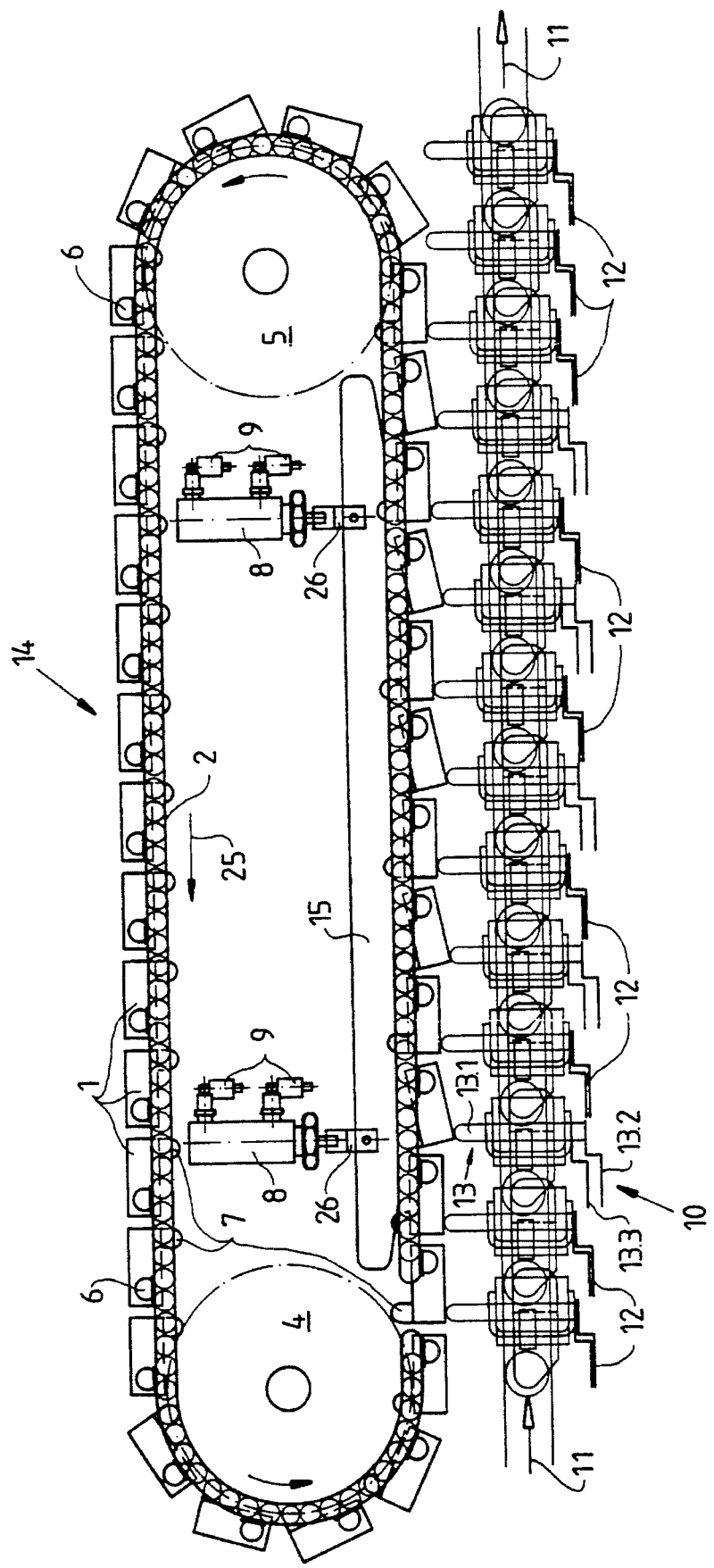
FIG. 1 is a side view of a release module in accordance with the present invention located above a conveyor.

FIG. 1 illustrates a side view of a release module 14 above an endless conveyor 10. The release module 14 includes rotating members 2 which hold swivelable blocks 1 mounted on axes 6. The rotating members 2, illustrated as a chain in FIG. 1, move around chain wheels 4 and 5.

As illustrated in FIG. 1, actuating units 8 are provided between the chain wheels 4 and 5. Each of the actuating units 8 is provided with connections 9. The actuating units 8 are designed to function with a pressure medium. Thus, the actuating units 8 could be pneumatic cylinders as well as hydraulic cylinders. Alternatively, the actuating units 8 could also function electromagnetically or in connection with an electric motor. Even a leverbar could be used. The actuating units 8 are connected with selectively operable ramps 15, 16 and 17 (shown more fully in FIG. 2) by means of connecting pieces 26.

Each swivelable block 1 is mounted on the rotating member 2 by its respective axes 6 and has a respective tab 18, 19, or 20. For simplicity, only tab 18 is illustrated in FIG. 1. These tabs 18, 19, or 20 effect a deflection of certain ones of the swivelable blocks 1 while passing below the selectively operable ramps 15, 16 and 17, depending on which tabs are contacted by the ramps.

Figure 2:
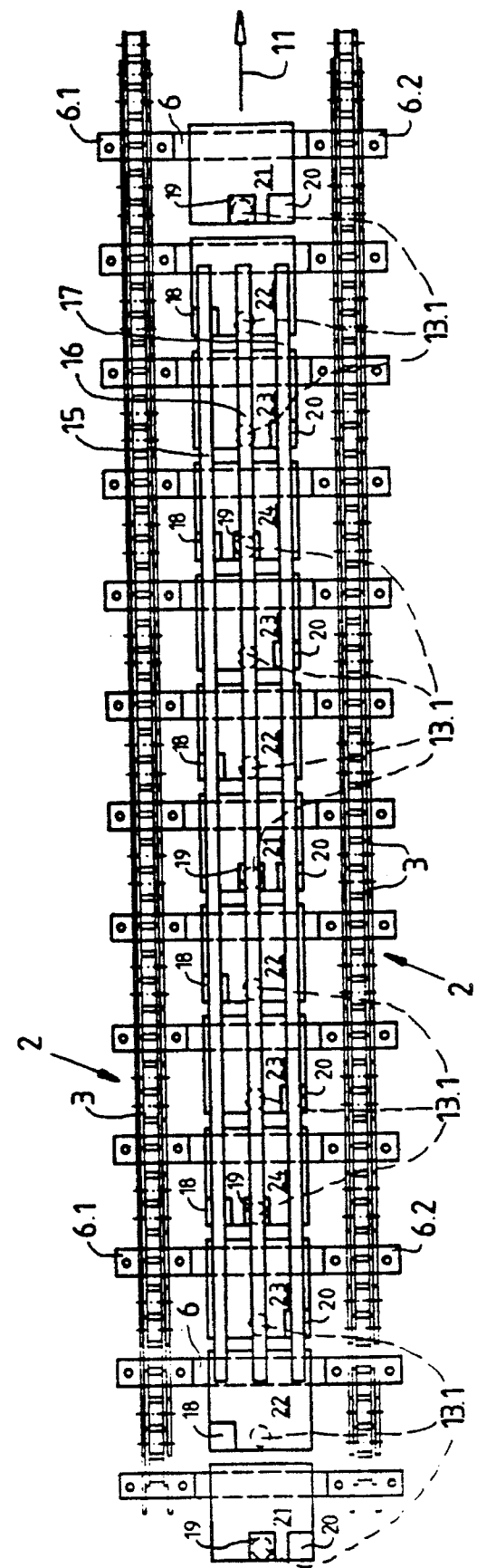
FIG. 2 is a top view of the longitudinally extending selectively operable ramps of FIG. 1.

In the embodiment of the present invention shown in FIGS. 1 and 2, each block 1 has a bore therein in which its corresponding axes 6 is mounted. Each block 1 is therefore free to rotate about its axes 6. The axis 6 is mounted to the rotating member 2 through pieces 6.1 and 6.2. In accordance with an embodiment of the present invention, the blocks 1 are made of a lightweight material so that the weight of the blocks 1 is insufficient to release the product holding devices 12 without the additional force provided by the ramps 15, 16, or 17. Alternatively, the swivelable blocks 1 may be mounted on the axes 6 in such a manner that the blocks will remain in a horizontal position during a horizontally extending movement section above the conveyer 10. As would be apparent to one of ordinary skill in the art, this could be accomplished in a variety of manners including, for example, using torsion triggered axes, or balancing the blocks by applying weights and/or adjusting the position of the axes.

The swivelable blocks 1, which are deflectable through the selectively operable ramps 15, 16 and 17, are arranged above a conveyor 10. The conveyor 10 comprises identically designed product-holding devices 12 which are continuously transported in the conveying direction 11. The product-holding devices 12 can be actuated through actuating mechanisms 13 respectively assigned to them. Such an actuating mechanism 13 may include an adjustable pin 13.1, a movable gripper part 13.2, and a stationary limit stop 13.3. To the adjustable pin 13.1, which can be moved downward through a swivelable block 1, a movable gripper part 13.2 is fastened which cooperates with a limit stop 13.3. When a group of swivelable blocks 1 is being actuated through a selectively operable ramp - for example through ramp 15—the contact between the movable gripper part 13.2 and the stationary limit stop 13.3 is interrupted by the motion of the adjustable pin 13.1, and the gripped product is released.

FIG. 2 illustrates a top view of the release module 14 with longitudinally extending selectively operable ramps 15, 16 and 17. The rotating members 2 are shown here as chains consisting of chain links 3. The chain links 3 hold pieces 6.1 and 6.2 on which the axes 6 of the swivelable blocks 1 are supported. The blocks 1, which are rotationally mounted on respective axes 6 are subdivided into several block types.

A first block type 21 has tabs 19 in the center as well as first outer tabs 20. In FIG. 2, every sixth one of the swivelable blocks 1 belongs to the first block type 21. As viewed in the conveying direction, a swivelable block of type 22 is located next to the swivelable block of type 21 arranged at the outer left. This second block type 22 has second outer tabs 18. Next to the second block type 22 there is a third block type 23 which only has first outer tabs 20. Next to this third block type 23 there is a fourth block type 24 (fourth block from the left in FIG. 2) which has center tabs 19 and second outer tabs 18.

Referring to FIG. 2, the swivelable blocks 1 are arranged by block type in a mirror-image arrangement. In other words the blocks are arranged as follows: block type 21, block type 22, block type 23, block type 24, block type 23, block type 22, block type 21, block type 22 . . . and so on throughout the entire circumference of the rotating members 2. As can be seen in FIG. 2, below the various groups of swivelable blocks 21, 22, 23 and 24, the corresponding adjustable pins 13.1 of the identical actuating mechanisms 13 of the product-holding means 12 are indicated by broken lines.

Referring to FIG. 1, the selectively operable first ramp 15 is actuated through the actuating units 8. Thus, the swivelable blocks 1 which have a tab positioned below this first ramp 15 are deflected. As indicated in FIG. 2, the second and the fourth type swivelable blocks 22 and 24, respectively, have second outer tabs 19 which are positioned below the first selectively operable element 15. A lowering of the first selectively operable element 15, therefore, leads to a deflection of the swivelable blocks 22 and 24 and ultimately to an opening of every second product-holding device 12 as illustrated in FIG. 1.

The opening of each second product-holding means 12 which passes below the release module 14 can also be realized in an alternative way. The operation of the second selectively operable ramp 17 causes a lowering of the first and the third type swivelable blocks 21 and 23.

These have, as shown in FIG. 2, respective first outer tabs 20 which are positioned below the second selectively operable ramp 17. Thus, a release of each second one of the products gripped by a product-holding means 12 can also take place in this way.

The operation of a third selectively operable ramp 16 effects the release of each third one of the products gripped by the product-holding means. The first and the fourth type swivelable blocks 21 and 24 are respectively provided with a center tab 19 which is positioned below the third selectively operable ramp 16. Since each third one of the swivelable blocks on the rotating members 2 belongs to one of the two types 21 and 24, each third product is releasable through the operation of the third selectively operable ramp 16.

If the first and the second selectively operable ramps 15 and 17 are actuated (e.g. lowered) at the same time, all products which were gripped are released through the swivelable blocks of all four block types 21, 22, 23 and 24. An illustration of these various release modes is shown in the table of FIG. 3.

The direction of the rotating members 2 of the release module 14 and the conveying direction 11 of the product-holding means 12 are the same.

What is claimed is:

1. A device for the release of products transported on a conveyer, comprising:

a release module including rotating members to which a plurality of swivelable blocks are attached, each of said swivelable blocks having one or more tabs;

a conveyor which transports a plurality of identical product holders past said release module, each of said identical product holders being associated with one of said swivelable blocks as said conveyor transports said product holders past said release module;

a plurality of selectively actuable ramps associated with said release module, each of said selectively actuable ramps operably disposed relative to selected ones of the tabs, actuation of each selectively actuable ramps thereby causing said ramp to contact its selected tabs, and causing said blocks passing by said actuated ramps and having said tabs corresponding to said actuated ramps to swivel, the swiveling of the blocks causing said associated product holders to release products.

2. The device according to claim 1, wherein said selectively actuable ramps are displaced from one another in a direction perpendicular to the direction of travel of said conveyor.

3. The device according to claim 1, wherein said selectively actuable ramps are displaced from one another in the direction of travel of said conveyor.

4. The device according to claim 1, wherein each of said selectively actuable ramps is connected by at least one connecting piece to an actuating unit.

5. The device according to claim 1, wherein said plurality of blocks includes plurality of different block types.

6. The device according to claim 5, wherein a first block type of the plurality of different block types includes a center tab and a first outer tab.

7. The device according to claim 5, wherein a second block type of the plurality of different block types includes a second outer tab.

8. The device according to claim, 5, wherein a third block type of the plurality of different block types includes a first outer tab.

9. The device according to claim 5, wherein a fourth block type of the plurality of different block types includes a center tab and a second outer tab.

10. The device according to claim 5, wherein a first block type and a third block type of said plurality of different block types each include a first outer tab; and a first outer selectively actuable ramp of said plurality of selectively actuable ramps is operably disposed relative to the first outer tabs.

11. The device according to claim 10, wherein every second block of said plurality of blocks is one of said first and said third block types, such that actuation of said first outer selectively actuable ramp causes a release of a folded product from every second one of said product holders.

12. The device according to the claim 5 wherein:

a first block type and a fourth block type of said plurality of different block types each include a center tab; and a center selectively actuable ramp of said plurality of selectively actuable ramps is operably disposed relative to the center tabs.

13. The device according to claim 12, wherein every second block of said plurality of blocks is one of said second and said fourth block types, such that actuation of said second outer selectively actuable ramp causes a release of a folded product from second other of said product holders.

14. The device according to the claim 5, wherein:

a second block type and a fourth block type of said plurality of different block types includes a second outer tab; and a second outer selectively actuable ramp of said plurality of selectively actuable ramps is operably disposed relative to the second outer tabs.

15. The device according to claim 14, wherein every third block of said plurality of blocks is one of said first and said fourth of block types, such that the actuation of said center selectively actuable ramp causes a release of a folded product from every third one of said product holders.

16. The device according to the claim 5, wherein:

a first block type and a third block type of said plurality of different block types include a first outer tab, every odd one of the blocks being one of the first and third block types;

a second block type and a fourth block type of said plurality of different block types include a second outer tab, every even one of the blocks being one of the second and fourth block types;

a first outer selectively actuable ramp of said plurality of said selectively actuable ramps is operably disposed relative to the first outer tabs;

a second outer selectively actuable ramp of said plurality of said selectively actuable ramps is operably disposed relative to the second outer tabs;

actuation of both said first and second outer selectively actuable ramps causing a release of said folded product from every one of said product holders;

actuation of only one of said first and second outer selectively actuable ramp causes a release of a folded product from every second one of said product holders.

17. The device according to claim 16, wherein a first block type and a fourth block type of said plurality of different block types each include a center tab, every third one of the blocks being one of the first and fourth block types;

a center selectively actuable ramp of said plurality of said selectively actuable ramps being operably disposed relative to the center tabs;

actuation of said center selectively actuable ramp causing a release of a folded product from every third one of said product holders.

* * * * *